(12) United States Patent
Sokun et al.

(10) Patent No.: US 11,882,525 B2
(45) Date of Patent: Jan. 23, 2024

(54) DISCRETE POWER ALLOCATION FOR NON-ORTHOGONAL MULTIPLE ACCESS SYSTEMS

(71) Applicant: Telefonaktiebolaget LM Ericsson (publ), Stockholm (SE)

(72) Inventors: Hamza Sokun, Ottawa (CA); Akram Bin Sediq, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 506 days.

(21) Appl. No.: 17/272,039

(22) PCT Filed: Sep. 8, 2018

(86) PCT No.: PCT/IB2018/056857
§ 371 (c)(1),
(2) Date: Feb. 26, 2021

(87) PCT Pub. No.: WO2020/049350
PCT Pub. Date: Mar. 12, 2020

(65) Prior Publication Data
US 2022/0159578 A1  May 19, 2022

(51) Int. Cl.
*H04W 52/14* (2009.01)
*H04W 52/34* (2009.01)
*H04W 52/36* (2009.01)

(52) U.S. Cl.
CPC ......... *H04W 52/143* (2013.01); *H04W 52/34* (2013.01); *H04W 52/36* (2013.01)

(58) Field of Classification Search
CPC .... H04W 52/143; H04W 52/34; H04W 52/36
See application file for complete search history.

(56) References Cited

U.S. PATENT DOCUMENTS

| 2015/0312074 A1 | 10/2015 | Zhu et al. |
| 2016/0073382 A1 | 3/2016 | Li et al. |

(Continued)

OTHER PUBLICATIONS

International Search Report and Written Opinion dated May 6, 2019 for International Application No. PCT/IB2018/056857 filed on Sep. 8, 2018, consisting of 12-pages.

(Continued)

*Primary Examiner* — Harry H Kim
(74) *Attorney, Agent, or Firm* — Sage Patent Group

(57) ABSTRACT

Apparatuses and corresponding methods for discrete power allocation for a non-orthogonal multiple access, NOMA, system are provided. A set of discrete power allocation values is determined. Each power allocation value is assigned to a particular wireless device, WD, in a set of WDs. The determining includes subjecting the power allocation values to at least one constraint to reduce a number of power allocation value combinations. A plurality of superimposed data signals are transmitted to the WDs in the set. Each data signal is intended for a different one of the WDs in the set and has a different power allocation value. Each WD in the set receives all the plurality of superimposed data signals. A different control signal is transmitted to each WD in the set of WDs. The control signal includes an indication of the power level allocation values of the set of discrete power allocation values.

20 Claims, 11 Drawing Sheets

(56) References Cited

U.S. PATENT DOCUMENTS

| | | | |
|---|---|---|---|
| 2016/0095069 A1* | 3/2016 | Noh | H04W 52/34 |
| | | | 455/452.1 |
| 2016/0219529 A1* | 7/2016 | Benjebbour | H04W 72/23 |
| 2016/0270005 A1* | 9/2016 | Li | H04W 52/241 |
| 2017/0171876 A1* | 6/2017 | Tavildar | H04W 8/22 |
| 2019/0181981 A1* | 6/2019 | Hwang | H04L 1/20 |
| 2020/0068495 A1* | 2/2020 | Yang | H04W 52/325 |
| 2021/0076333 A1* | 3/2021 | Gaal | H04W 52/346 |
| 2022/0377788 A1* | 11/2022 | Chou | H04L 1/0041 |

OTHER PUBLICATIONS

Zaw Chit Wutyee et al: "User clustering based on correlation in 5G using semidefinite programming", 2017 19TH Asia-Paci fic Network Operations and Management Symposium (APNOMS), IEEE, Sep. 27, 2017 (Sep. 27, 2017), pp. 342-345, XP033243413, consisting of 4-pages.

Gau Rung-Hung et al: "Scalable NOMA multicast in cellular networks", 2016 IEEE 27th Annual International Symposium on Personal, Indoor, and Mobile Radio Communications (PIMRC), IEEE, Sep. 4, 2016 (Sep. 4, 2016), pp. 1-6, XP033035456, consisting of 6-pages.

Lee Sunyoung et al: Joint User Scheduling and Power Allocation for Energy Efficient Millimeter Wave NOMA Systems With Random Beamforming, 2018 IEEE 88th Vehicular Technology Conference (VTC—Fall), IEEE, Aug. 27, 2018 (Aug. 27, 2018), pp. 1-5, XP033535260, consisting of 5-pages.

* cited by examiner

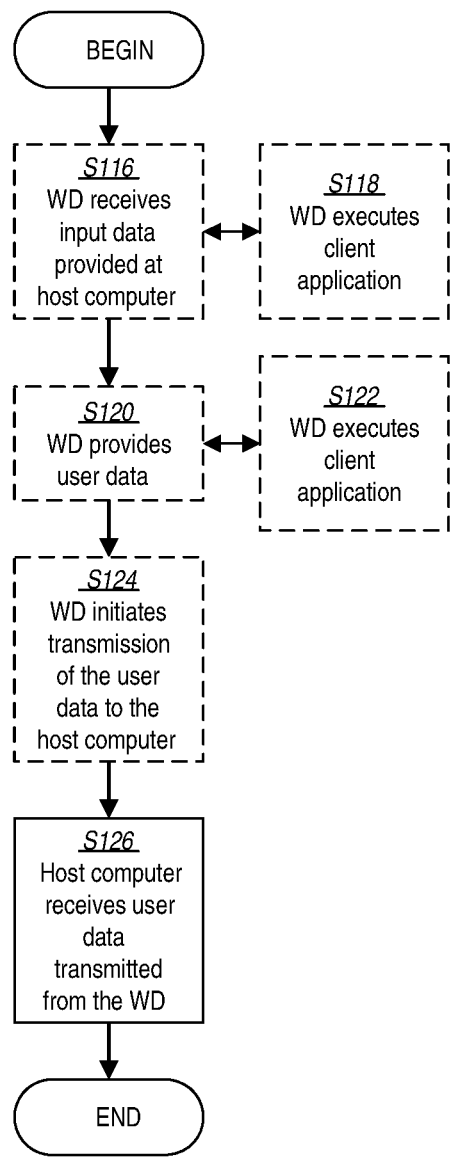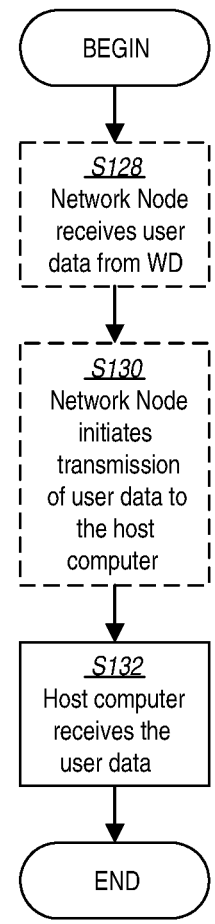
FIG. 9
FIG. 10

DISCRETE POWER ALLOCATION FOR NON-ORTHOGONAL MULTIPLE ACCESS SYSTEMS

CROSS-REFERENCE TO RELATED APPLICATIONS

This application is a Submission Under 35 U.S.C. § 371 for U.S. National Stage Patent Application of International Application Number: PCT/IB2018/056857, filed Sep. 8, 2018 entitled "DISCRETE POWER ALLOCATION FOR NON-ORTHOGONAL MULTIPLE ACCESS SYSTEMS," the entirety of which is incorporated herein by reference.

TECHNICAL FIELD

The present disclosure relates to wireless communication and in particular, for discrete power allocation for a non-orthogonal multiple access (NOMA) wireless communication system.

BACKGROUND

Non-orthogonal multiple access (NOMA) has been proposed as a technique for fifth generation (5G) networks and beyond. In Long Term Evolution (LTE) Release 13, a study item on downlink power-domain multiplexing NOMA, has been referred to as multi-user superposition transmission (MUST). The fundamental idea behind this technique is to multiplex multiple users in the power domain at the transmitter side based on superposition coding, and then to perform multi-user signal separation, i.e., interference cancellation at the receiver side based on successive interference cancellation (SIC) processing. That is to say that the NOMA technique exploits an extra new domain to accommodate multiple users within the same orthogonal time-frequency resource block (RB), which is not sufficiently exploited in the current LTE systems.

Since NOMA utilizes this additional power domain, it should always outperform the traditional orthogonal multiple access (OMA) schemes, e.g., frequency division multiple access (FDMA)/time division multiple access (TDMA)/code division multiple access (CDMA)/orthogonal frequency division multiple access (OFDMA), in terms of sum-throughput. Another feature of NOMA, is that throughput-fairness among users may be improved as compared with other arrangements, because NOMA allocates more power to users with poor channel conditions and less power for users with better channel conditions. Specifically, this feature may have importance for some applications in 5G networks, such as Internet-of-Things (IoT). In the IoT, the massive number of devices that require only a small amount of data can be served in the same band. For this application, achieving high connectivity may be more desirable than achieving high data rate to satisfy high quality-of-service (QoS) requirements.

Reaping the benefits of NOMA may depend on making optimal use of the limited power resource in the network. Particularly, in NOMA with SIC, the power allocation to a certain user impacts the achievable throughput of not only that user, but also other users due to inter-user interference. Hence, improper power allocation can significantly deteriorate the overall performance of NOMA. There have been numerous investigations into the impact of power allocation on the performance of NOMA systems. For instance, researchers have investigated features of optimal/non-optimal power allocation, high complexity/low complexity implementations, different type of fairness, different scenario single-channel power amplifiers (PA), multi-channel/cluster PA.

For making non-orthogonal transmission feasible, advanced transmission/reception techniques, such as dirty paper coding (DPC) or SIC, may be used at the wireless device (WD) receivers. In past research, application of SIC to the WD receivers was considered in the cellular downlink for interference cancellation. Additionally, in some cases it is assumed that the SIC receivers are capable of perfectly cancelling the interference in NOMA. However, in practice this assumption cannot be readily realized due to inaccurate power amplification (PA) and imperfect channel decoding, resulting in inter-user error propagation that makes difficult the implementation of SIC. Hence, to mitigate the error propagation at SIC receivers, the power allocation among WDs should be handled carefully. Taking the discrete property of power allocation into consideration is used by many existing technologies. Restricting the power allocations to be discrete simplifies the hardware design and reduces the cost of practical transmitters. Although some consider continuous transmit power to find the solutions, applying those schemes in practical systems can be problematic. For example, rounding does not guarantee optimality and rounding may cause inaccurate power allocation. Thus, this convenient continuous power assumption has mainly been due to either the limitations of the optimization tools applied and/or the high computational complexity involved in addressing the more realistic discrete power allocation/control.

SUMMARY

Some embodiments advantageously provide a method and system for discrete power allocation for a non-orthogonal multiple access (NOMA) wireless communication system.

Some embodiments provide a fairness-aware power allocation algorithm for energy efficiency (EE) maximization (which can be measured in bits/Joule) in downlink NOMA systems. Unlike previous related efforts, a throughput-fairness constraint applying a weighted Jain's fairness index is imposed, and the transmit power levels are constrained to assume discrete, rather than continuous values, which renders the algorithm developed herein amenable to practical systems. However, the restriction on the power levels to be discrete, and a non-concave objective usually result in difficult-to-solve non-convex combinatorial formulations. The optimal, but computationally prohibitive, approach for solving such combinatorial problems is to perform an exhaustive search. To reduce the computational complexity of the exhaustive search, some embodiments exploit the structure of NOMA with SIC and devise a low-complexity algorithm. The devised algorithm not only may yield an optimal solution, but also enables power allocation optimization for NOMA with a relatively high number of power levels. The devised algorithm may also be applicable to any desired objective function with any set of constraints.

Some advantages of some embodiments are summarized as follows and include:
1. Practical significance: Some embodiments bridge the divide between theoretical designs and practical implementation of power allocation algorithms. A proposed solution maximizes the overall energy efficiency, while taking several practical design concerns into consideration, such as discrete power levels, fairness among users' throughput, and per-user minimum rate requirements.

2. Optimality and computational complexity: The above-mentioned considerations add another dimension to the difficulty of the EE maximization problem that is, in its simplest form, combinatorial non-deterministic polynomial time (NP)-hard. In particular, the structure of the non-convex problem is investigated, and then, an optimal power control algorithm with significantly lower complexity is proposed. This algorithm can be directly applied to practical systems without need of any further effort, e.g., rounding of the results.

3. Design simplification: Continuous power levels can be regarded as the extreme case of discrete power level, where the number of power levels is infinite. Exchanging the information for these continuous power levels will induce high communication overheads in the system. Moreover, there are some limitations in the implementation of continuous solutions in actual hardware. Hence, a proposed solution herein not only simplifies the hardware design, but also, reduces the information exchange overhead within the system.

4. Applicability of the proposed solution to different problems: A solution approach proposed herein can be readily applied to various problems, regardless of their objectives and constraints, in which the users are ordered based on their channel quality.

According to one aspect, a method for a network node for discrete power allocation for a non-orthogonal multiple access, NOMA, system is provided. The method includes determining a set of discrete power allocation values, each power allocation value being assigned to a particular wireless device, WD, in a set of WDs, the determining including subjecting the power allocation values to at least one constraint to reduce a number of power allocation value combinations. The method further includes transmitting to the WDs in the set, a plurality of superimposed data signals, each data signal intended for a different one of the WDs in the set and having a different power allocation value, each WD in the set receiving all the plurality of superimposed data signals. The method also includes transmitting to each WD in the set of WDs a different control signal, the control signal including an indication of the power level allocation values of the set of discrete power allocation values.

According to this aspect, in some embodiments, the control signal for a first WD includes the power allocation values of all the WDs in the set, the control signal for a second WD in the set includes the power allocation values of all the WDs in the set other than the first WD, the control signal for a third WD in the set includes the power allocation values of all the WDs in the set other than the first and second WDs, wherein the control signal for a last WD in the set includes the power allocation value of only the last WD. In some embodiments, the control signal for the first WD includes a modulation and coding scheme, MCS, for all but the first WD, the control signal for the second WD includes an MCS for all but the first and second WD, wherein the control signal for the last WD does not include an MCS for the last WD or for any other WD in the set. In some embodiments, the control signal for the first WD includes an identifier for all but the first WD, the control signal for the second WD includes an identifier for all but the first and second WD, wherein the control signal for the last WD does not include an identifier for the last WD or for any other WD in the set. In some embodiments, the at least one constraint comprises a total power constraint. In some embodiments, the total power constraint specifies that a sum of the power allocation values for the WDs in the set is less than a predetermined total power value. In some embodiments, the at least one constraint comprises a constraint specifying that the WDs in the set are ordered for assignment of power allocation values based on a channel quality of each WD in the set. In some embodiments, determining a set of discrete power allocation values includes constraining the power allocation values to satisfy an inequality having terms consisting of a product of a power allocation value and a channel gain, an algebraic sum of the terms being less than a power difference determined to distinguish between a signal to be decoded and remaining non-decoded message signals.

According to another aspect, a network node configured for discrete power allocation for a non-orthogonal multiple access, NOMA, system. The network node includes processing circuitry configured to: determine a set of discrete power allocation values, each power allocation value being assigned to a particular wireless device, WD, in a set of WDs, the determining including subjecting the power allocation values to at least one constraint to reduce a number of power allocation value combinations. The processing circuitry is configured to transmit to the WDs in the set, a plurality of superimposed data signals, each data signal intended for a different one of the WDs in the set and having a different power allocation value, each WD in the set receiving all the plurality of superimposed data signals. The processing circuitry is further configured to transmit to each WD in the set of WDs a different control signal, the control signal including an indication of the power level allocation values of the set of discrete power allocation values.

According to this aspect, in some embodiments, the control signal for a first WD includes the power allocation values of all the WDs in the set, the control signal for a second WD in the set includes the power allocation values of all the WDs in the set other than the first WD, the control signal for a third WD in the set includes the power allocation values of all the WDs in the set other than the first and second WDs, wherein the control signal for a last WD in the set includes the power allocation value of only the last WD. In some embodiments, the control signal for the first WD includes a modulation and coding scheme, MCS, for all but the first WD, the control signal for the second WD includes an MCS for all but the first and second WD, wherein the control signal for the last WD does not include an MCS for the last WD or for any other WD in the set. In some embodiments, the control signal for the first WD includes an identifier for all but the first WD, the control signal for the second WD includes an identifier for all but the first and second WD, wherein the control signal for the last WD does not include an identifier for the last WD or for any other WD in the set. In some embodiments, the at least one constraint comprises a total power constraint. In some embodiments, the total power constraint specifies that a sum of the power allocation values for the WDs in the set is less than a predetermined total power value. In some embodiments, the at least one constraint comprises a constraint specifying that the WDs in the set are ordered for assignment of power allocation values based on a channel quality of each WD in the set. In some embodiments, the determining a set of discrete power allocation values includes constraining the power allocation values to satisfy an inequality having terms consisting of a product of a power allocation value and a channel gain, an algebraic sum of the terms being less than a power difference determined to distinguish between a signal to be decoded and remaining non-decoded message signals.

According to another aspect, computer storage device is provided for storing a computer program that, when executed by at least one processor in a network node, performs at least one method described below.

According to yet another aspect, a method for a wireless device, WD, for decoding a data signal in a plurality of superimposed data signals in a non-orthogonal multiple access, NOMA, system is provided. The method includes receiving the plurality of superimposed data signals, each data signal intended for a different one of a plurality of WDs in a set and having a power allocation value. The method also includes receiving a control signal that indicates power allocation values for a number of WDs in a set, the control signal having information that enables the WD to decode the data signal intended for the WD. The method further includes decoding the data signal by treating all but one of the superimposed data signals as interference and applying successive interference cancellation of the all but one of the superimposed data signals. According to this aspect, in some embodiments, the control signal includes the power allocation values of all but one of the WDs in the set.

According to another aspect, a wireless device, WD, configured to decode a data signal in a plurality of superimposed data signals in a non-orthogonal multiple access, NOMA, system is provided. The WD includes processing circuitry configured to: receive the plurality of superimposed data signals, each data signal intended for a different one of the WDs in the set and having a power allocation value; receive a control signal that indicates power allocation values for a number of WDs in a set, the control signal having information that enables the WD to decode the data signal intended for the WD; and decode the data signal by treating all but one of the superimposed data signals as interference and applying successive interference cancellation of the all but one of the superimposed data signals. According to this aspect, the control signal includes the power allocation values of all but one of the WDs in the set.

According to yet another aspect, a computer storage device is provided for storing a computer program that, when executed by at least one processor in a wireless device, performs at least some methods described below.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flow chart illustrating example methods implemented in a communication system including a host computer, a network node and a wireless device for receiving user data from the wireless device at a host computer according to some embodiments of the present disclosure;

FIG. 10 is a flow chart illustrating example methods implemented in a communication system including a host computer, a network node and a wireless device for receiving user data at a host computer according to some embodiments of the present disclosure;

DETAILED DESCRIPTION

Figure 1:
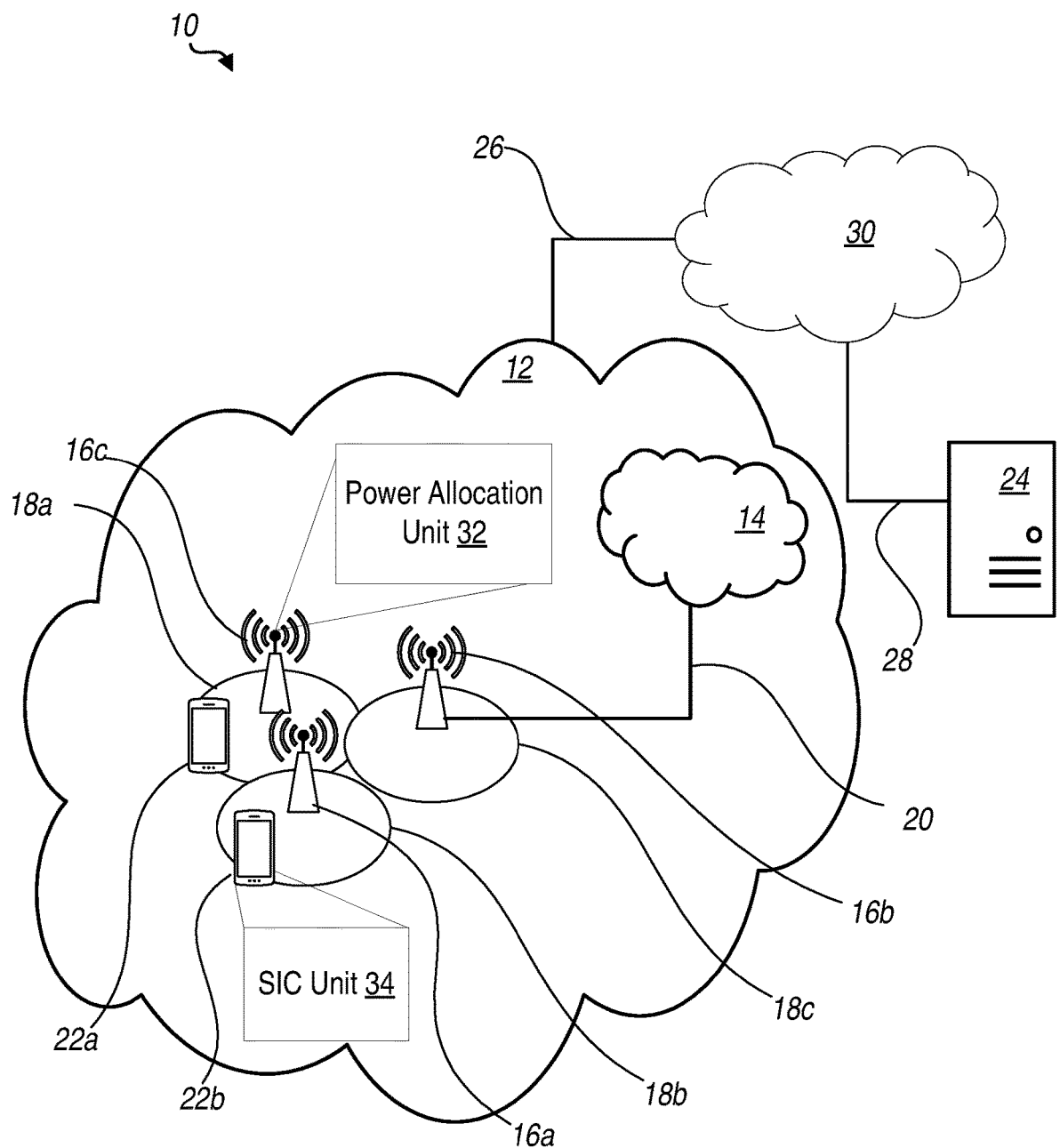
FIG. 1 is a schematic diagram of an example network architecture illustrating a communication system connected via an intermediate network to a host computer according to the principles in the present disclosure

Before describing in detail example embodiments, it is noted that the embodiments reside primarily in combinations of apparatus components and processing steps related to discrete power allocation for a non-orthogonal multiple access (NOMA) system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD (or UE) herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

According to some embodiments, a method and apparatus for finding the optimum transmission power used for each WD in a NOMA system where the transmission powers are a subset of discrete power levels is provided. In some embodiments, the optimal power levels are signaled to the WDs using semi-static signaling, e.g., RRC signaling, or more dynamically using MAC control elements (MAC CE) or downlink control information (DCI).

Returning to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a power allocation unit 32 which is configured to determine a power allocation for a cluster of WDs 22. A wireless device 22 is configured to include a successive interference cancellation (SIC) unit 34 which is configured to cancel signals embedded in a signal received by the WD 22.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a Power Allocation unit 32 which is configured to determine a power allocation for a cluster of WDs.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a successive interference cancellation (SIC) unit 34 which is configured to cancel signals embedded in a signal received by a the WD 22.

Figure 2:
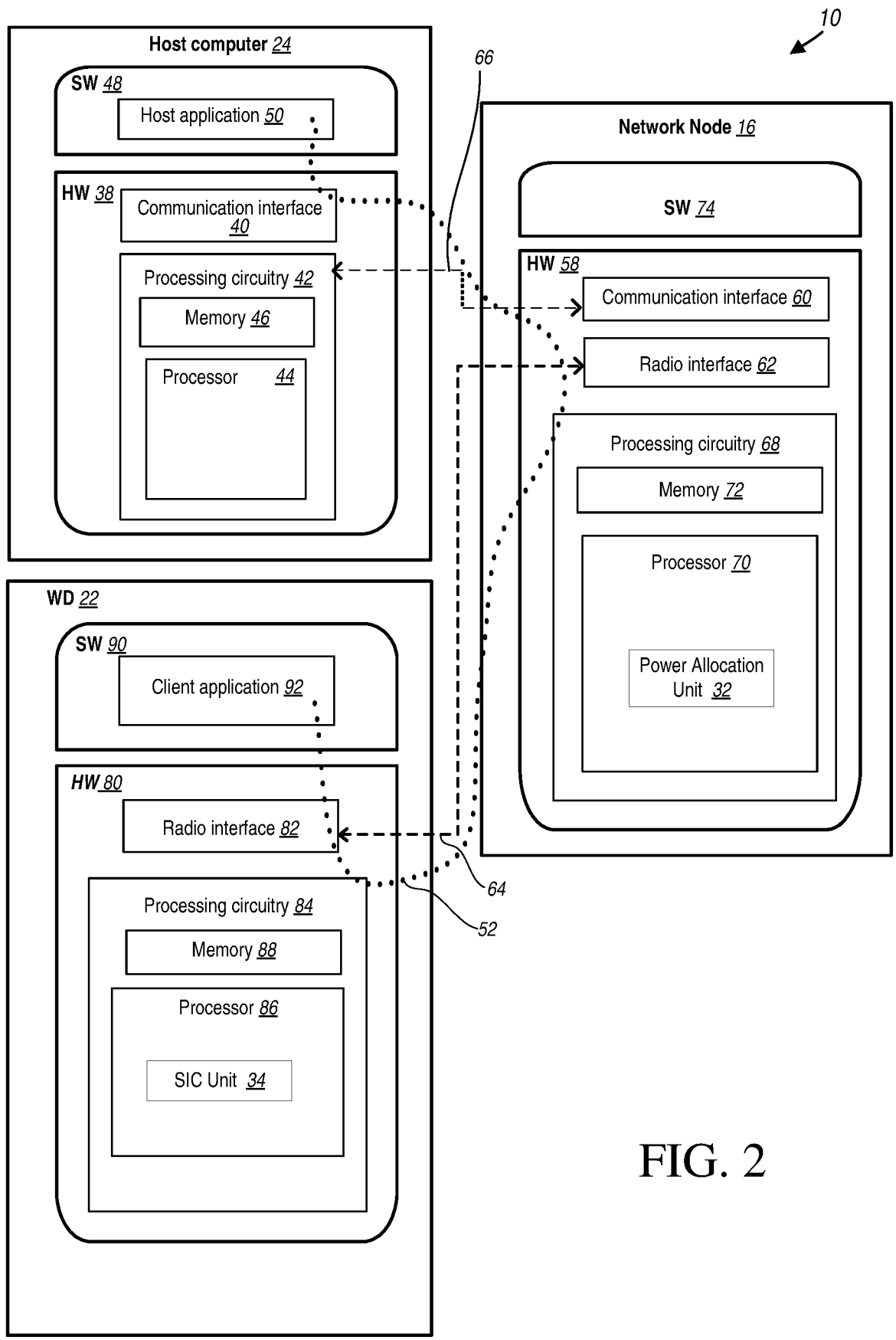
FIG. 2 is a block diagram of a host computer communicating via a network node with a wireless device over an at least partially wireless connection according to some embodiments of the present disclosure

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62.

In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as power allocation unit 32, and SIC unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
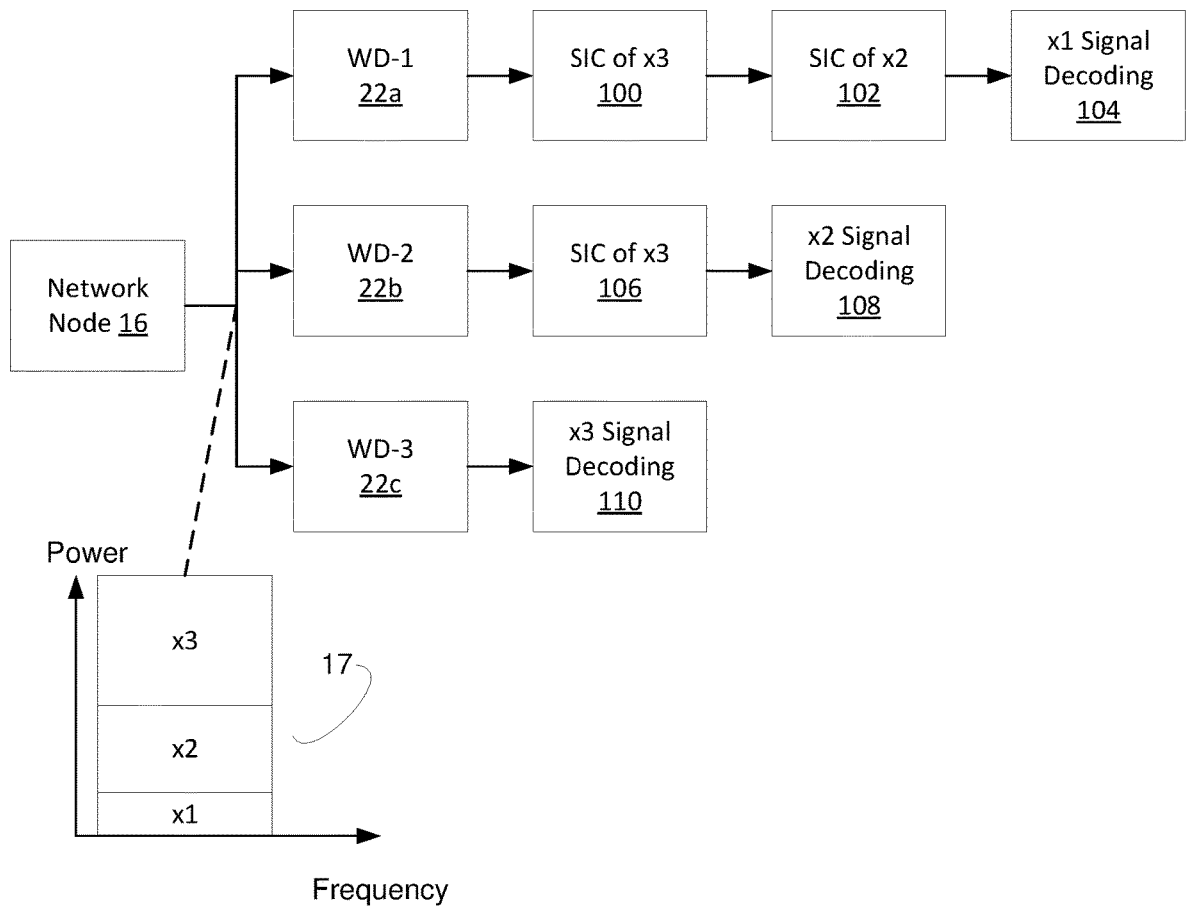
FIG. 3 illustrates a network node communicating with three WDs and how each WD processes the signal received from the base station

A power control scheme for a simple transmission scenario is shown in FIG. 3, where a network node 16 with a single antenna transmits a superposition of three signals, x1, x2 and x3, to three wireless devices WD-1 22-1, WD-2 22-2 and WD-3 22-3, the superposition of the three signals being transmitted with a single antenna, over the same resource block (RB). Although three signals are shown here, carrying over the analysis to the case with an m-user downlink NOMA cluster, or to the case of multiple antennas at both the BS and the users, is contemplated. Thus, in other embodiments, one or more antennas may be used to transmit a superposition of m≥3 signals x1, . . . xm, to a cluster of m WDs 22. Here it assumed that the WD 22-1, WD 22-2 and WD 22-3 have been pre-selected for the NOMA transmission based on a user-clustering algorithm. User-clustering algorithms are beyond the scope of this disclosure.

According to the multiuser superposition transmission scheme, the transmitted signal may be formed as $\hat{x}=x_1+x_2+x_3$, and $x_i=\sqrt{P_i}s_i$, where $s_i$ is the symbol for user i with $E[|s_i|^2]=1$, and $P_i$ is the transmit power associated with $s_i$. The channel gains of the users, $U_1$, $U_2$, and $U_3$, are respectively $H_1=|h_1|^2$, $H_2=|h_2|^2$, $H_3=|h_3|^2$, where $h_i$ is the complex channel coefficient between $U_i$ and the BS, and $H_1>H_2>H_3$. It is assumed that the transmit power of the users is allocated in inverse proportion to their channel gains, and SIC is employed at the receivers of users to reduce the interference from the other users on the same resource block (RB).

Thus, for this example, the signal x3 intended for WD-3 22c is allocated greater power than the power allocated to signal x2 intended for WD-2 22b, which is greater than the power allocated to signal x1 intended for WD-1. This is shown in the plot of power versus frequency 17 in FIG. 3. At WD-1 22a, successive interference cancellation 100 of the strongest signal x3 is performed. Then, WD-1 22a performs successive interference cancellation 102 of the next strongest signal x2. Then, x1 is decoded 104. At WD-2 22b, successive interference cancellation 106 of the only signal stronger than x2, i.e., signal x3, is applied, followed by decoding 108 of x2. At WD-3 22c, since the power of signal x3 is larger than the power of signals x1 and x2, decoding 110 of signal x3 can be performed without a step of successive interference cancellation.

Figure 4:
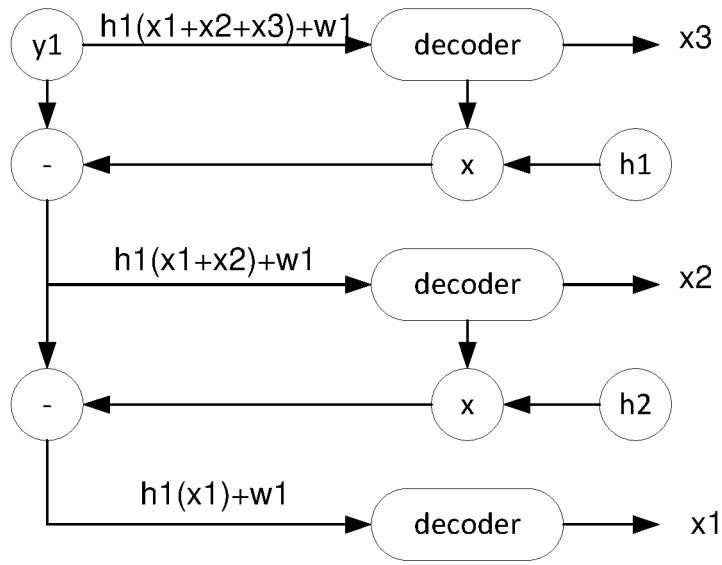
FIG. 4 illustrates the signal processing of the three WDs of FIG. 3.
Figure 4:
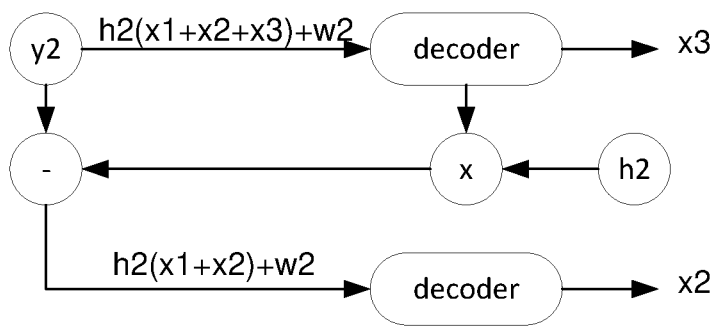
Figure 4:
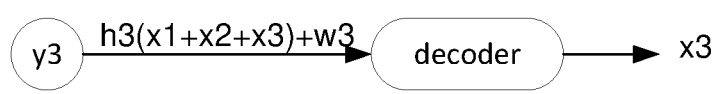

The SIC operations at the receivers of the WDs 22 may be thus summarized as follows: The achievable throughput for signal in a 3-user NOMA system, $R_i$, can be expressed as $$R_i = W\log_2\left(1 + \frac{P_iH_i}{\sum_{j=1}^{i-1} P_jH_i + WN_0}\right),$$

where W is the bandwidth of each RB, and $N_0$ is the power spectral density of the additive white Gaussian noise (AWGN). The signal processing structures in WD-1 22a, WD-2 22b and WD-3 22c that may be used to achieve the signal decoding described above are shown in FIG. 4. In some embodiments, these signal processing functions may be performed by SIC unit 34. Thus, in the WD-1 22a, the top branch decodes x3 when combined with x1 and x2, the middle branch decodes x2 when combined with x1, and the lower branch decodes x1. In the WD-2 22b, the top branch decodes x3 when combined with x1 and x2, and the lower branch decodes x2 when combined with x1. In the WD-3 22c, x3 is decoded when combined with x1 and x2.

In some embodiments, orthogonal frequency division multiplexing (OFDM) signaling with a cyclic prefix to eliminate inter-symbol interference and non-orthogonal user multiplexing may be assumed. Also, a downlink MUST Category-1 transmission scheme may be assumed, in which component constellations are directly linear superposed, without ensuring Gray mapping. Due to the inferior property of a non-Gray mapped constellation as compared with a Gray mapped constellation, an advanced receiver at the user implementing codeword-level successive interference cancellation (CWIC) may be considered. Superposition coding at the transmitter with SIC at the receiver may achieve the capacity of a single-input single output (SISO) broadcast channel.

Figure 5:
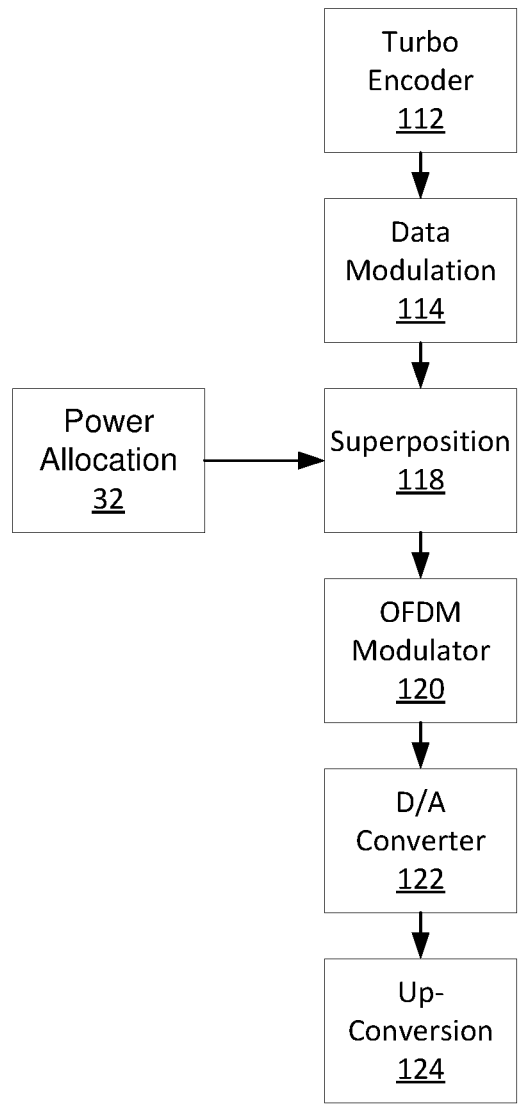
FIG. 5 is structure of a network node transmitter constructed according to embodiments described herein.

A structure of an example transmitter of the radio interface 62 at a network node 16 is shown in FIG. 5. For each user data signal, an encoder 112, such as a turbo encoder, performs channel encoding, and a modulator 114 performs data modulation, and then the three data signals are superimposed 118 according to a predefined power ratio determined by the power allocation unit 32 that may be separate from the transmitter of the radio interface 62, as shown in FIG. 2. Then, the superimposed signal is OFDM modulated 120 and converted to analog 124 before up conversion 124 to the carrier frequency.

Figure 6:
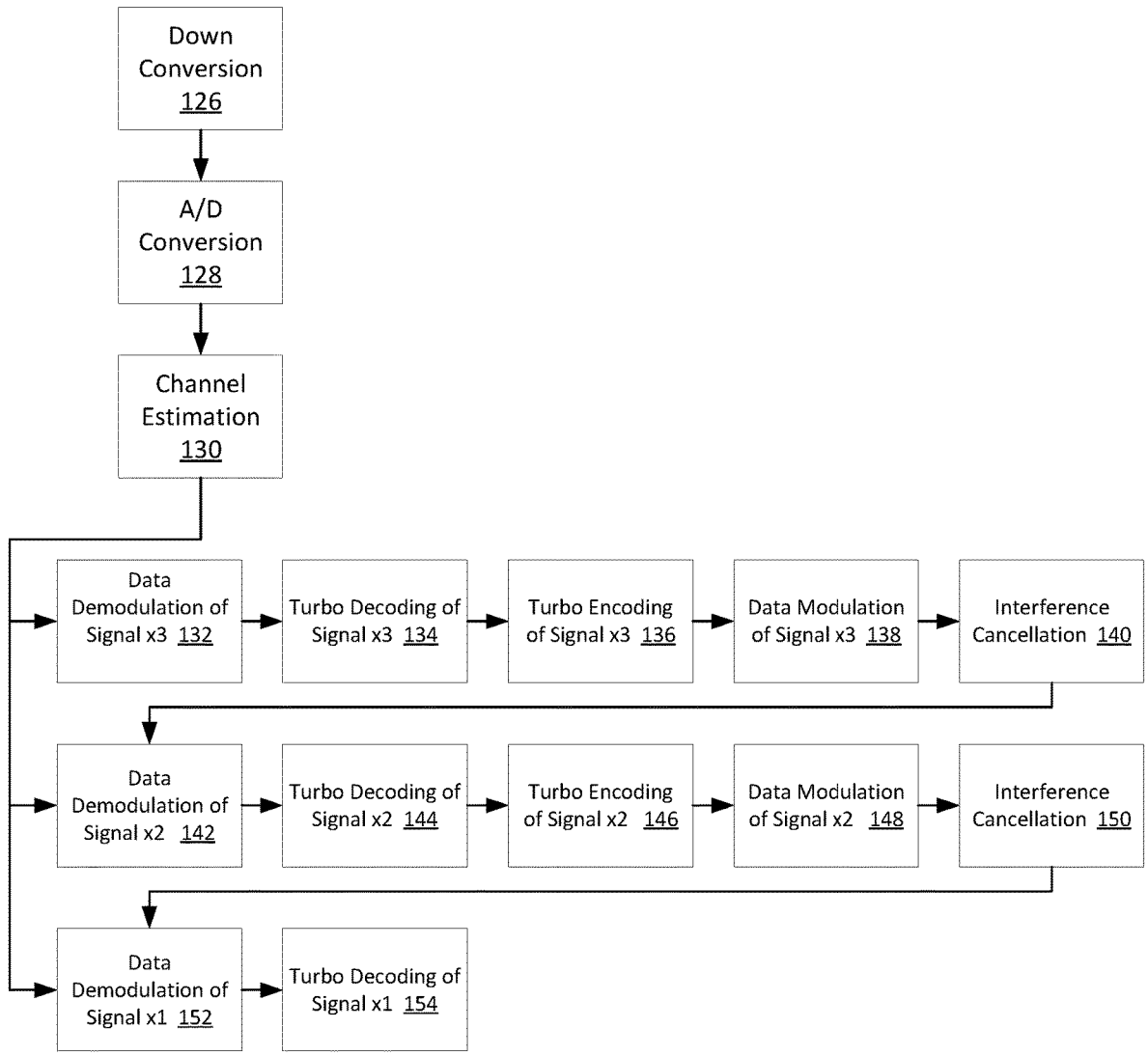
FIG. 6 is a structure of a WD receiver constructed according to embodiments described herein.
Figures 7, 8:
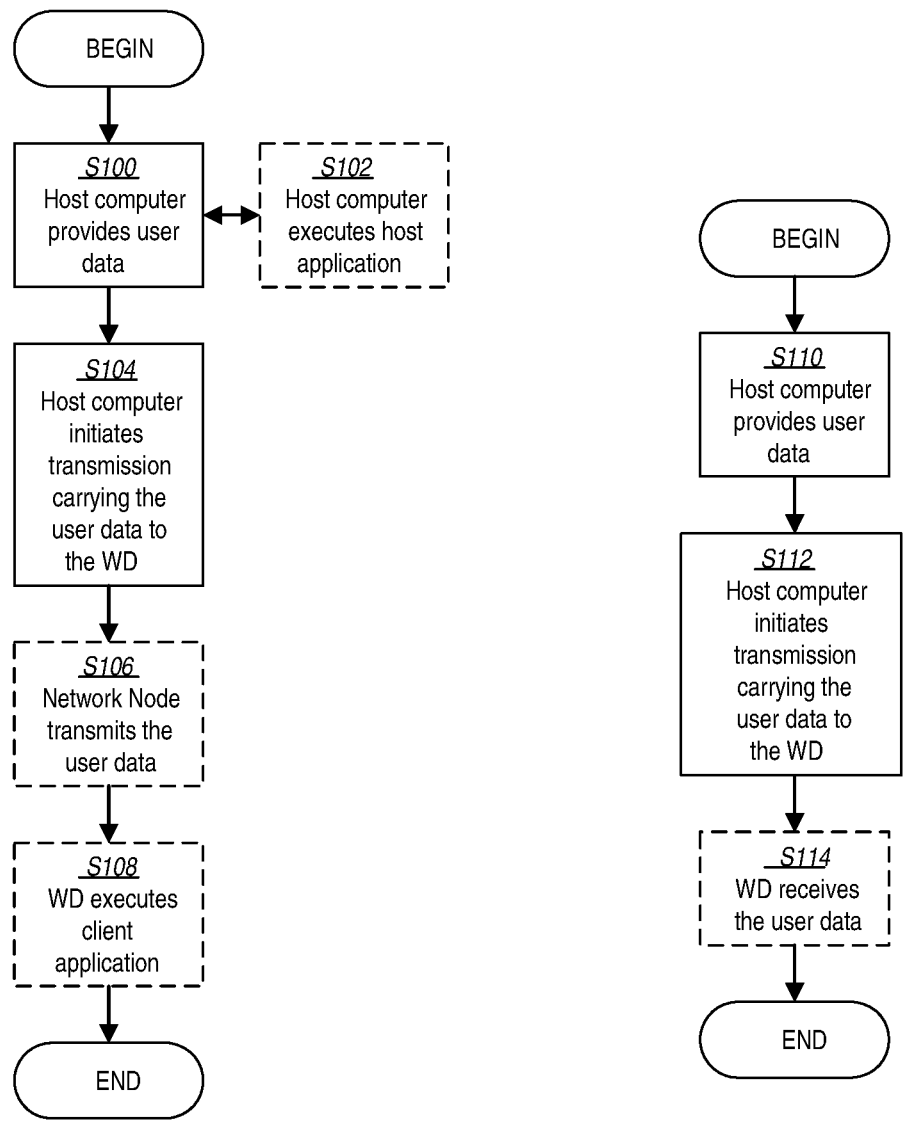
FIG. 7 is a flow chart illustrating example methods implemented in a communication system including a host computer, a network node and a wireless device for executing a client application at a wireless device according to some embodiments of the present disclosure.
FIG. 8 is a flow chart illustrating example methods implemented in a communication system including a host computer, a network node and a wireless device for receiving user data at a wireless device according to some embodiments of the present disclosure.

A structure of an example receiver of the radio interface 82 at the WD 22-1 22a is shown in FIG. 6. The received signal is first down-converted 126 and converted to a digital signal 128. Channel estimation 130 is performed and the resultant signal is provided for further processing. CWIC is applied to cancel the strong interference of signal x3. First, x3 is demodulated 132, decoded 134, encoded 136 and modulated 138 to generate an x3 replica, which is subtracted from the received signal to achieve first interference cancellation 140. The functions of interference cancellation unit 140 may be performed by the SIC unit 34, which may be separate from the receiver of the radio interface 82, as shown in FIG. 2. Similarly, the WD 22-1 demodulates the data of signal x2 142, decodes the signal x2 144, encodes the signal 146, modulates the signal 148 and subtracts the signal, via interference canceller 150, from the signal remaining from subtracting x1. Then, the signal from interference canceller 150 is data demodulated 152 and decoded to obtain signal x1, 154. The function of interference canceller 150 may be performed by the SIC unit 34, as shown in FIG. 2 FIG. 7 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

FIG. 8 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 9 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 10 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 11:
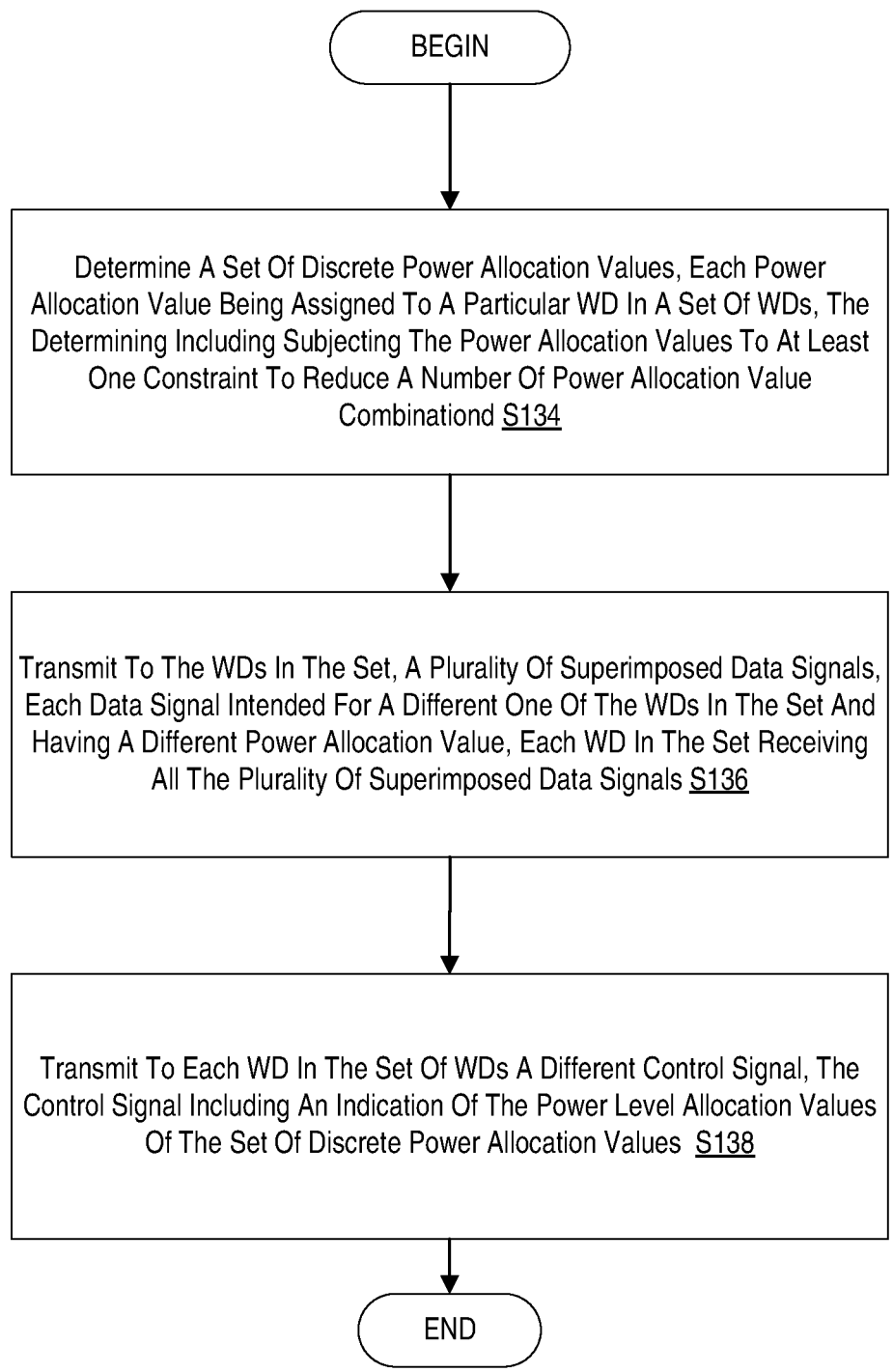
FIG. 11 is a flowchart of an example process for a network node constructed in accordance with embodiments described herein.

FIG. 11 is a flowchart of an example process in a network node 16 for discrete power allocation for a NOMA system. The process includes determining, via the power allocation unit 32, a set of discrete power allocation values, each power allocation value being assigned to a particular WD 22 in a set of WDs, the determining including subjecting the power allocation values to at least one constraint to reduce a number of power allocation value combinations (block S134). The process also includes transmitting, via the radio interface 62, to the WDs in the set, a plurality of superimposed data signals, each data signal intended for a different one of the WDs in the set and having a different power allocation value, each WD in the set receiving all the plurality of superimposed data signals (block S136). The process also includes transmitting, via the radio interface 62, to each WD in the set of WDs a different control signal, the control signal including an indication of the power level allocation values of the set of discrete power allocation values (block S138).

Figure 12:
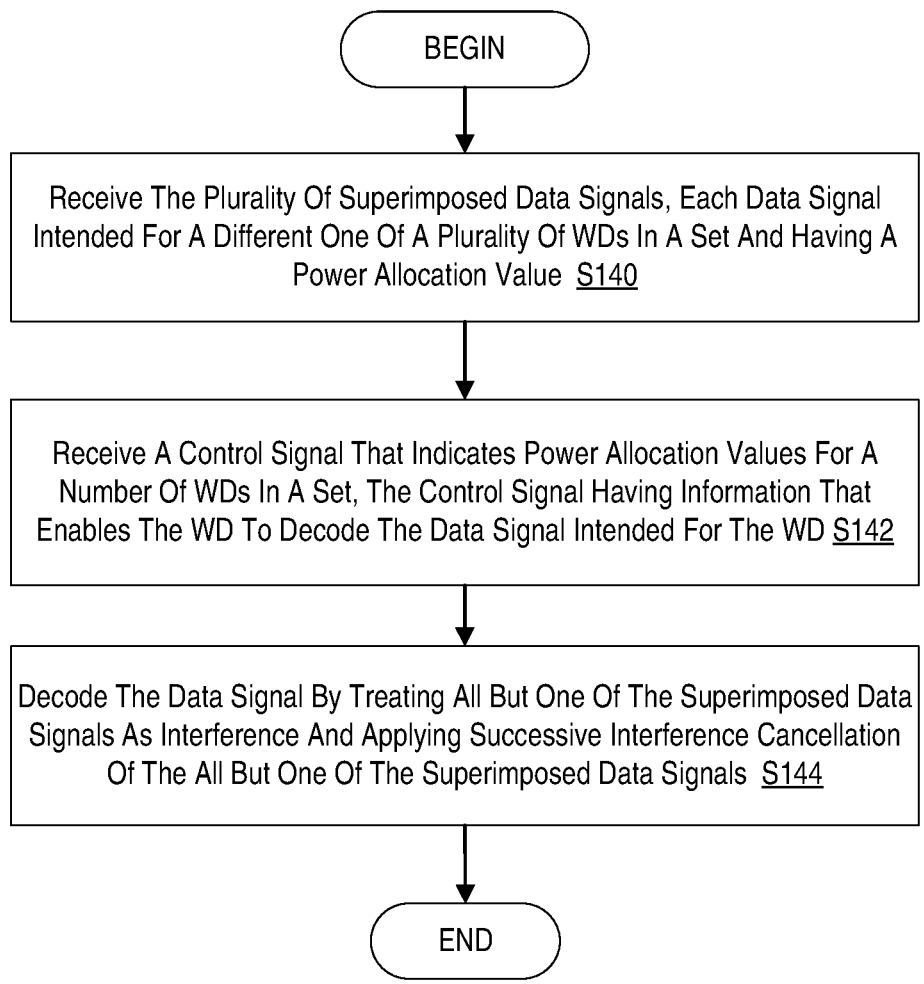
FIG. 12 is a flowchart of an example process for a WD constructed in accordance with embodiments described herein.

FIG. 12 is a flowchart of an example process in a wireless device 22 according to some embodiments of the present. The process includes receiving, via the radio interface 82, the plurality of superimposed data signals, each data signal intended for a different one of a plurality of WDs in a set and having a power allocation value (block S140). The process also includes receiving, via the radio interface 82, a control signal that indicates power allocation values for a number of WDs in a set, the control signal having information that enables the WD to decode the data signal intended for the WD (block S142). The process further includes decoding, via the SIC unit 34, the data signal by treating all but one of the superimposed data signals as interference and applying successive interference cancellation of the all but one of the superimposed data signals (block S144).

Having described the general process flow of arrangements of the disclosure and having provided examples of hardware and software arrangements for implementing the processes and functions of the disclosure, the sections below provide additional details and examples of arrangements for discrete power allocation for a non-orthogonal multiple access (NOMA) system.

Power Allocation Problem Formulation

The power allocation problem for energy-efficiency maximization in downlink NOMA can be formulated as $$\text{Objective: } \max_{P_1, P_2, P_3} \frac{R_1 + R_2 + R_3}{\frac{1}{q}(P_1 + P_2 + P_3) + P_{constant}};$$

-continued

Constraint-1: $\frac{(w_1 R_1 + w_2 R_2 + w_3 R_3)^2}{3((w_1 R_1)^2 + (w_2 R_2)^2 + (w_3 R_3)^2)} > J_0;$ Constraint-2: $P_1 + P_2 + P_3 < P_{total};$ Constraint-3: $R_1 > R_{min}, R_2 > R_{min},$ and $R_3 > R_{min};$ Constraint-4: $P_1 < P_2 < P_3,$ where $H_1 > H_2 > H_3;$ Constraint-5: $P_1, P_2, P_3 \in \{P_1^s, P_2^s, \ldots, P_L^s\}.$ where $R_{min}$ is the minimum rate requirement, R1, R2 and R3 are the respective rates for each WD 22, Jo is a desired Jain's fairness level, $P_{total}$ is total power constraint, $w_i$ is the i-th user weight, q is the power amplifier efficiency constant, $P_{constant}$ is circuitry power consumption at the base station (BS), and $\{P_1^s, P_2^s, \ldots, P_L^s\}$ denotes the set of power levels, where L is the cardinality of the set. Any or all of R1, R2 and R3 can be set to the same or different values. The Jain's fairness level may be a number between 1/n (worst case) and 1 (best case), where n is the number of WDs 22. For example, Jo may be chosen as 0.6.

Solution Approach

Figure 13:
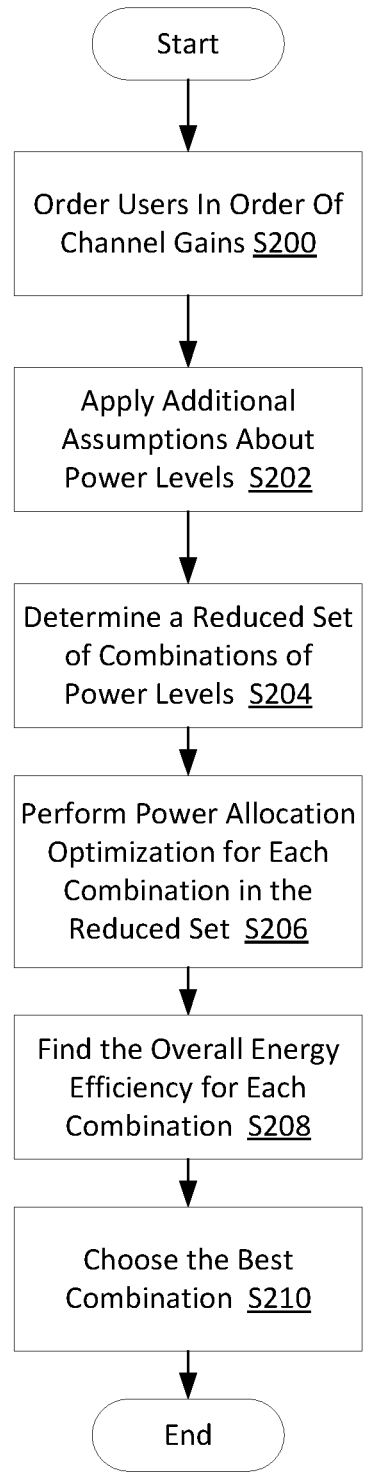
FIG. 13 is a flowchart of an example process in a network node for determining a power allocation according to embodiments described herein.

An algorithm to find a combination of transmit powers is presented as shown in the flowchart of FIG. 13. In some embodiments, this algorithm may be performed by the power allocation unit 32 of the network node 16. The set of all possible combinations of the power levels is denoted by $S_P$. The cardinality of $S_P$ is represented as $|S_P|$, e.g., for L=10, $|S_P|=10^3$. The number of such combinations can grow prohibitively high. To lower the number of combinations, the formulation structure is investigated, and some observations are made. For instance, when the users are ordered based on their channel quality, as in block S200, for L=10, the number of combinations can be reduced to $|S'_P|=120$, where $|S'_P|$ is the set of reduced combinations. For this case, the cardinality of the set of reduced combinations of the power levels can be found by using the closed-form expression, $$\frac{L(L-2)(L-1)}{6}.$$

Note that the reduction is more pronounced for a higher number of power levels. In addition to this observation, there are few more assumptions regarding the power allocations by the power allocation unit 32, which will help to further reduce the complexity of the algorithm. For instance, for efficient SIC at the WD 22-1 receiver, the following conditions for power allocation may be satisfied:

To distinguish between the transmit signal to be decoded and the remaining non-decoded message signals:
$P_3 H_1 - (P_1 + P_2) H_1 > P_{tol}$
$P_2 H_1 - P_1 H_1 > P_{tol},$ and
$P_{tol}$ is the minimum power difference required to distinguish between the signal to be decoded and the remaining non-decoded message signals, e.g., 10 dBm.

Similarly, for efficient SIC at the WD 22-2 22*b* receiver, the following conditions for power allocation may be satisfied, To distinguish between the transmit signal to be decoded and the remaining non-decoded message signals:
$P_3 H_2 - (P_1 + P_2) H_2 > P_{tol}$ After these additional observations for the SIC receiver are applied (block S202), the cardinality of the set of reduced combinations of the power levels can be significantly reduced. For instance, if $P_{tol}$ is assumed to be zero, then for L=10, the number of combinations can be reduced to $|S''_P|=8$, where $|S''_P|$ is the set of further reduced combinations. Thus, a reduced set of combinations of power levels can be determined (block S204). Then, power allocation optimization for each combination of power levels in the reduced set can be calculated as described above (block S206). Then, the overall energy efficiency of each combination is determined (block S208) and the combination with the best overall energy efficiency may be chosen (block S210).

Signaling

Control signaling may include (1) providing WDs 22 with assistance information for interference cancellation, and (2) configuring a WD for MUST operation. The assistance information which may be used by WD 22-1 and WD 22-2 may include the following: the modulation order, transmission block size, hybrid automatic repeat request (HARQ) information, limited buffer rate matching assumption, parameters for descrambling and cyclic redundancy check of the paired user, and the transmission power levels of other respective users. For instance, for WD 22-1, information for signals x2 and x3 may be required, and for WD 22-2 only information for signal x3 may be required.

Applicable control signaling to the WDs 22 to implement the embodiments described above may be summarized as follows:

When a WD 22 is connected to the network node 16, it is configured through radio resource control (RRC) signaling with the power levels of the combination selected according to the process of FIG. 13. The power levels can be embedded in the radio resource control (RRC) Reconfiguration message.

During NOMA transmission, the downlink control information (DCI) sent to WD 22-1 may be modified to include:
Indices of the power levels for first, second, and third WDs (WD 22-1, WD 22-2 and WD 22-3);
Modulation and coding scheme (MCS) for the second, and third WDs (WD 22-2 and WD 22-3);
Optionally, the physical resource block (PRB) allocation of the second and third WDs. When this is not present, the first WD assumes that NOMA is used for all PRBs scheduled to the first WD.

During NOMA transmission, the downlink control information (DCI) sent to WD 22-2 is modified to include:
Indices of the power levels for the second, and third WDs;
MCS for the third WD;
Optionally, the PRB allocation of the third WD. When this is not present, the first WD assumes that NOMA is used for all PRBs scheduled to the second WD.

During NOMA transmission, the third WD's downlink control information (DCI) is modified to include also:
Index of the power-level for the third WD (WD 22-3).

It is also possible to convey the indices of power levels using medium access control control elements (MAC CE) instead of conveying these indices in DCI.

Thus, in some embodiments, the following steps and conditions may be implemented for communicating data and control signals in the NOMA system described in some embodiments herein.

1. Via a Physical Downlink Shared Channel (PDSCH), transmitting the first data signal, the second data signal and the third data signal as a superimposed signal comprising the first data signal according to the first power allocation level, the second data according to the second power allocation level, and the third data according to the third power allocation level.
2. Via a physical downlink control channel (PDCCH), transmitting a first DCI message associated with the first WD, a second DCI message associated with the second WD, and a third DCI message associated with the third WD.
3. The first control signal, the second control signal and the third control signal indicate that the first data signal, the second data signal and the third data signal are transmitted via NOMA, respectively.
4. The first control signal, the second control signal and the third control signal can include sufficient information for the first WD, the second WD, and the third WD to decode, respectively, the first data signal, the second data signal, and the third data signal.
5. The first control signal indicates power levels of the first data signal, the second data signal and the third data signal, and further indicates a modulation and coding scheme (MCS) of the second and third data signals, and transmits an identifier of the second and third WDs 22. Note that in some embodiments, the transmission of the identifiers is optional and may be used for decoding and demodulation, and may further be useful for scrambling.
6. The second control signal indicates power levels of the second data signal, and the third data signal, indicates a modulation and coding scheme (MCS) of the third data signal, and transmits an identifier of the third WD.
7. The third control signal indicates a power level of the third data signal.

According to one aspect, a method for a network node 16 for discrete power allocation for a non-orthogonal multiple access, NOMA, system is provided. The method includes determining (block S134) a set of discrete power allocation values, each power allocation value being assigned to a particular wireless device, WD 22, in a set of WDs 22, the determining including subjecting the power allocation values to at least one constraint to reduce a number of power allocation value combinations. The method further includes transmitting (block S136) to the WDs 22 in the set, a plurality of superimposed data signals, each data signal intended for a different one of the WDs 22 in the set and having a different power allocation value, each WD 22 in the set receiving all the plurality of superimposed data signals. The method also includes transmitting (block S138) to each WD 22 in the set of WDs 22 a different control signal, the control signal including an indication of the power level allocation values of the set of discrete power allocation values.

According to this aspect, in some embodiments, the control signal for a first WD 22 includes the power allocation values of all the WDs 22 in the set, the control signal for a second WD 22 in the set includes the power allocation values of all the WDs 22 in the set other than the first WD 22, the control signal for a third WD 22 in the set includes the power allocation values of all the WDs 22 in the set other than the first and second WDs 22, wherein the control signal for a last WD 22 in the set includes the power allocation value of only the last WD 22. In some embodiments, the control signal for the first WD 22 includes a modulation and coding scheme, MCS, for all but the first WD 22, the control signal for the second WD 22 includes an MCS for all but the first and second WD 22, wherein the control signal for the last WD 22 does not include an MCS for the last WD 22 or for any other WD 22 in the set. In some embodiments, the control signal for the first WD 22 includes an identifier for all but the first WD 22, the control signal for the second WD 22 includes an identifier for all but the first and second WD 22, wherein the control signal for the last WD 22 does not include an identifier for the last WD 22 or for any other WD 22 in the set. In some embodiments, the at least one constraint comprises a total power constraint. In some embodiments, the total power constraint specifies that a sum of the power allocation values for the WDs 22 in the set is less than a predetermined total power value. In some embodiments, the at least one constraint comprises a constraint specifying that the WDs 22 in the set are ordered for assignment of power allocation values based on a channel quality of each WD 22 in the set. In some embodiments, determining a set of discrete power allocation values includes constraining the power allocation values to satisfy an inequality having terms consisting of a product of a power allocation value and a channel gain, an algebraic sum of the terms being less than a power difference determined to distinguish between a signal to be decoded and remaining non-decoded message signals.

According to another aspect, a network node 16 configured for discrete power allocation for a non-orthogonal multiple access, NOMA, system. The network node 16 includes processing circuitry 68 configured to: determine a set of discrete power allocation values, each power allocation value being assigned to a particular wireless device, WD 22, in a set of WDs 22, the determining including subjecting the power allocation values to at least one constraint to reduce a number of power allocation value combinations. The processing circuitry 68 is configured to transmit to the WDs 22 in the set, a plurality of superimposed data signals, each data signal intended for a different one of the WDs 22 in the set and having a different power allocation value, each WD 22 in the set receiving all the plurality of superimposed data signals. The processing circuitry 68 is further configured to transmit to each WD 22 in the set of WDs 22 a different control signal, the control signal including an indication of the power level allocation values of the set of discrete power allocation values.

According to this aspect, in some embodiments, the control signal for a first WD 22 includes the power allocation values of all the WDs 22 in the set, the control signal for a second WD 22 in the set includes the power allocation values of all the WDs 22 in the set other than the first WD 22, the control signal for a third WD 22 in the set includes the power allocation values of all the WDs 22 in the set other than the first and second WDs 22, wherein the control signal for a last WD 22 in the set includes the power allocation value of only the last WD 22. In some embodiments, the control signal for the first WD 22 includes a modulation and coding scheme, MCS, for all but the first WD 22, the control signal for the second WD 22 includes an MCS for all but the first and second WD 22, wherein the control signal for the last WD 22 does not include an MCS for the last WD 22 or for any other WD 22 in the set. In some embodiments, the control signal for the first WD 22 includes an identifier for all but the first WD 22, the control signal for the second WD 22 includes an identifier for all but the first and second WD 22, wherein the control signal for the last WD 22 does not include an identifier for the last WD 22 or for any other WD 22 in the set. In some embodiments, the at least one constraint comprises a total power constraint. In some embodiments, the total power constraint specifies that a sum of the power allocation values for the WDs 22 in the set is less than a predetermined total power value. In some embodiments, the at least one constraint comprises a constraint specifying that the WDs 22 in the set are ordered for assignment of power allocation values based on a channel quality of each WD 22 in the set. In some embodiments, the determining a set of discrete power allocation values includes constraining the power allocation values to satisfy an inequality having terms consisting of a product of a power allocation value and a channel gain, an algebraic sum of the terms being less than a power difference determined to distinguish between a signal to be decoded and remaining non-decoded message signals.

According to another aspect, computer storage device is provided for storing a computer program that, when executed by at least one processor in a network node 16, performs at least one method described below.

According to yet another aspect, a method for a wireless device, WD 22, for decoding a data signal in a plurality of superimposed data signals in a non-orthogonal multiple access, NOMA, system is provided. The method includes receiving (block S140) the plurality of superimposed data signals, each data signal intended for a different one of a plurality of WDs 22 in a set and having a power allocation value. The method also includes receiving (block S142) a control signal that indicates power allocation values for a number of WDs 22 in a set, the control signal having information that enables the WD 22 to decode the data signal intended for the WD 22. The method further includes decoding (block S144) the data signal by treating all but one of the superimposed data signals as interference and applying successive interference cancellation of the all but one of the superimposed data signals. According to this aspect, in some embodiments, the control signal includes the power allocation values of all but one of the WDs 22 in the set.

According to another aspect, a wireless device, WD 22, configured to decode a data signal in a plurality of superimposed data signals in a non-orthogonal multiple access, NOMA, system is provided. The WD 22 includes processing circuitry 84 configured to: receive the plurality of superimposed data signals, each data signal intended for a different one of the WDs 22 in the set and having a power allocation value; receive a control signal that indicates power allocation values for a number of WDs 22 in a set, the control signal having information that enables the WD 22 to decode the data signal intended for the WD 22; and decode the data signal by treating all but one of the superimposed data signals as interference and applying successive interference cancellation of the all but one of the superimposed data signals. According to this aspect, the control signal includes the power allocation values of all but one of the WDs 22 in the set. According to yet another aspect, a computer storage device is provided for storing a computer program that, when executed by at least one processor in a wireless device, performs at least some methods described below.

| Abbreviation | Explanation |
| --- | --- |
| CE | Control Element |
| CWIC | Codeword-level Interference Cancellation |
| DCI | Downlink Control Information |
| EE | Energy Efficiency |
| MCS | Modulation and Coding Scheme |
| MUST | Multi-user Superposition Transmission |
| NOMA | Non-Orthogonal Multiple Access |
| SIC | Successive Interference Cancellation |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node for discrete power allocation for a non-orthogonal multiple access, NOMA, system, the method comprising:
   determining a set of discrete power allocation values, each power allocation value being assigned to a particular wireless device, WD, in a set of WDs, the determining including subjecting the power allocation values to at least one constraint to reduce a number of power allocation value combinations;
   transmitting to the WDs in the set, a plurality of superimposed data signals, each data signal intended for a different one of the WDs in the set and having a different power allocation value, each WD in the set receiving all the plurality of superimposed data signals; and
   transmitting to each WD in the set of WDs a different control signal, the control signal including an indication of the power level allocation values of the set of discrete power allocation values.

2. The method of claim 1, wherein the control signal for a first WD includes the power allocation values of all the WDs in the set, the control signal for a second WD in the set includes the power allocation values of all the WDs in the set other than the first WD, the control signal for a third WD in the set includes the power allocation values of all the WDs in the set other than the first and second WDs, wherein the control signal for a last WD in the set includes the power allocation value of only the last WD.

3. The method of claim 2, wherein the control signal for the first WD includes a modulation and coding scheme, MCS, for all but the first WD, the control signal for the second WD includes an MCS for all but the first and second WD, wherein the control signal for the last WD does not include an MCS for the last WD or for any other WD in the set.

4. The method of claim 2, wherein the control signal for the first WD includes an identifier for all but the first WD, the control signal for the second WD includes an identifier for all but the first and second WD, wherein the control signal for the last WD does not include an identifier for the last WD or for any other WD in the set.

5. The method of claim 1, wherein the at least one constraint comprises a total power constraint.

6. The method of claim 5, wherein the total power constraint specifies that a sum of the power allocation values for the WDs in the set is less than a predetermined total power value.

7. The method of claim 1 wherein the at least one constraint comprises a constraint specifying that the WDs in the set are ordered for assignment of power allocation values based on a channel quality of each WD in the set.

8. The method of claim 1, wherein determining a set of discrete power allocation values includes constraining the power allocation values to satisfy an inequality having terms consisting of a product of a power allocation value and a channel gain, an algebraic sum of the terms being less than a power difference determined to distinguish between a signal to be decoded and remaining non-decoded message signals.

9. A network node configured for discrete power allocation for a non-orthogonal multiple access, NOMA, system, the network node comprising:
   processing circuitry configured to:
      determine a set of discrete power allocation values, each power allocation value being assigned to a particular wireless device, WD, in a set of WDs, the determining including subjecting the power allocation values to at least one constraint to reduce a number of power allocation value combinations;
      transmit to the WDs in the set, a plurality of superimposed data signals, each data signal intended for a different one of the WDs in the set and having a different power allocation value, each WD in the set receiving all the plurality of superimposed data signals; and
      transmit to each WD in the set of WDs a different control signal, the control signal including an indication of the power level allocation values of the set of discrete power allocation values.

10. The network node of claim 9, wherein the control signal for a first WD includes the power allocation values of all the WDs in the set, the control signal for a second WD in the set includes the power allocation values of all the WDs in the set other than the first WD, the control signal for a third WD in the set includes the power allocation values of all the WDs in the set other than the first and second WDs, wherein the control signal for a last WD in the set includes the power allocation value of only the last WD.

11. The network node of claim 10, wherein the control signal for the first WD includes a modulation and coding scheme, MCS, for all but the first WD, the control signal for the second WD includes an MCS for all but the first and second WD, wherein the control signal for the last WD does not include an MCS for the last WD or for any other WD in the set.

12. The network node of claim 10, wherein the control signal for the first WD includes an identifier for all but the first WD, the control signal for the second WD includes an identifier for all but the first and second WD, wherein the control signal for the last WD does not include an identifier for the last WD or for any other WD in the set.

13. The network node of claim 9, wherein the at least one constraint comprises a total power constraint.

14. The network node of claim 13, wherein the total power constraint specifies that a sum of the power allocation values for the WDs in the set is less than a predetermined total power value.

15. The network node of claim 9 wherein the at least one constraint comprises a constraint specifying that the WDs in the set are ordered for assignment of power allocation values based on a channel quality of each WD in the set.

16. The network node of claim 9, wherein the determining a set of discrete power allocation values includes constraining the power allocation values to satisfy an inequality having terms consisting of a product of a power allocation value and a channel gain, an algebraic sum of the terms being less than a power difference determined to distinguish between a signal to be decoded and remaining non-decoded message signals.

17. A method for a wireless device, WD, for decoding a data signal in a plurality of superimposed data signals in a non-orthogonal multiple access, NOMA, system, the method comprising:
   receiving the plurality of superimposed data signals, each data signal intended for a different one of a plurality of WDs in a set and having a power allocation value;
   receiving a control signal that indicates power allocation values for a number of WDs in a set, the control signal having information that enables the WD to decode the data signal intended for the WD; and
   decoding the data signal by treating all but one of the superimposed data signals as interference and applying successive interference cancellation of the all but one of the superimposed data signals.

18. The method of claim 17, wherein the control signal includes the power allocation values of all but one of the WDs in the set.

19. A wireless device, WD, configured to decode a data signal in a plurality of superimposed data signals in a non-orthogonal multiple access, NOMA, system, the WD comprising:
   processing circuitry configured to:
      receive the plurality of superimposed data signals, each data signal intended for a different one of WDs in a set and having a power allocation value;
      receive a control signal that indicates power allocation values for a number of WDs in a set, the control signal having information that enables the WD to decode the data signal intended for the WD; and
      decode the data signal by treating all but one of the superimposed data signals as interference and applying successive interference cancellation of the all but one of the superimposed data signals.

20. The WD of claim 19, wherein the control signal includes the power allocation values of all but one of the WDs in the set.

* * * * *